March 21, 1939.  W. JORDAN  2,151,324
FREEWHEEL HUB WITH COASTER BRAKE
Filed Oct. 9, 1937
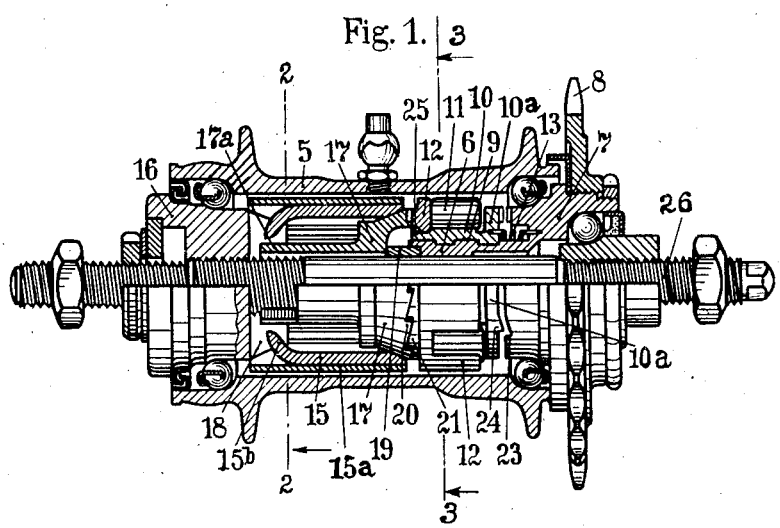
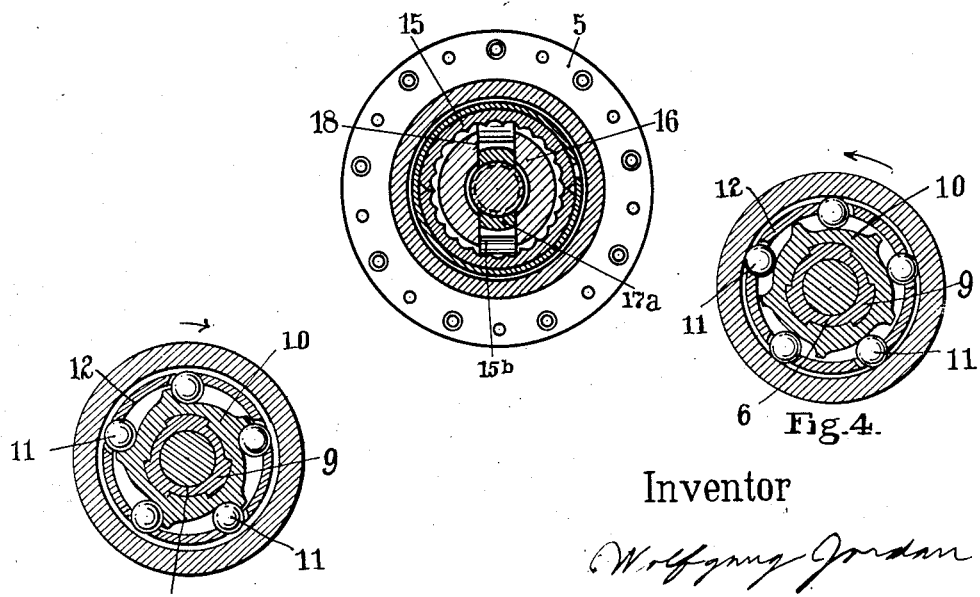
Inventor
Wolfgang Jordan
per
Dunn Fairbank & Hirsch
his Attys Patented Mar. 21, 1939

2,151,324

UNITED STATES PATENT OFFICE 2,151,324

FREEWHEEL HUB WITH COASTER BRAKE

Wolfgang Jordan, Schweinfurt, Germany

Application October 9, 1937, Serial No. 168,113
In Germany October 12, 1936

4 Claims. (Cl. 192—6)

The invention relates to a free-wheel hub with coaster-brake for the driving wheel of bicycles and more particularly to the free-wheel clutch thereof.

The object of the invention is to provide a new frictional roller clutch for driving or free-wheeling a cycle. Roller-clutches of this kind involve the drawback that the operative rollers commonly spaced apart in a cage or retainer ring, when allowed freely to move in the recesses of said ring will under the shocks due to the uneven pavement often take a position in which they are contacting the inner face of the rotating hub with the effect that the coupling thereof accomplishes.

The driving means of this kind are improved according to the invention by the use of a spiral spring interposed between the driving body of the free-wheel hub and a roller bearing member engaged with the said driving body by respective screw threads, the said spiral spring being so arranged that it tends to rotate the roller bearing member relatively on the driving body in the direction of forward rotation of the driving wheel, while a tooth coupling is disposed between the cage ring of said friction rollers and a stationary part of the free-wheel hub. This tooth coupling generally closed checks the rollers on the commencement of drive so that the rollers rise on the eccentrical jamming faces and are frictionally engaged with the hub shell, whereafter the roller bearing member is positively connected to the driving body through a special accessory coupling.

This combination of elements is advantageous in several respects in its operation, particularly in that friction between driving means and stationary parts of the hub is avoided in driving, free-wheeling and braking and that the change of operation takes place in a minimum of time.

In the accompanying drawing, which forms a part of this specification, an embodiment of the invention is represented by way of example.

In this drawing—

Fig. 1 is a longitudinal sectional elevation, some elements of the gear being shown in a side view in the lower part of this figure, Fig. 2 is a cross-section on the line 2—2 of Fig. 1, Fig. 3 is a sectional elevation on the line 3—3 of Fig. 1, showing the roller coupling in its disengaged position during free-wheeling and braking, the arrow showing the direction of rotation of the driver and the coupling mechanisms, and Fig. 4 is a like sectional elevation showing the roller coupling in its driving operation, the arrow denoting the direction of rotation of all driving means together with the hub shell.

Like numerals denote like parts in all figures.

The free-wheel coaster hub represented in the drawing comprises a driving body 7 supported on the wheel axle 26 in a conventional manner by a ball bearing, the chain-driven sprocket wheel 8 being fastened thereon. On a tubular extension 6 of the driving body are formed square right-handed screw threads 9 in which a coupling sleeve 10 engages by means of corresponding female screw threads so that it will be axially moved when it is prevented from rotation while the driving body is rotated on the axle. Opposite to the driver an end flange 10a is formed on the coupling sleeve 10, a helical spring 13 placed between the driver and said flange and engaged in both members with its axial end portions tending to rotate the sleeve 10 on the projection 9 in the direction of forward rotation of the wheel. Ratchet teeth 23 and 24 devised, respectively, on the driver and said flange 10a in a limited number and facing each other are provided with axial flanks for engagement in the driving operation so that the driving body will carry round with it the sleeve 10 when rotating in the forward direction but disengage it in the relative backward rotation, owing to the oblique disposition of the other flanks of said teeth.

Oblique or eccentrical circumferential recesses of the coupling sleeve 10, such as shown in the U. S. Patent No. 777,811, Fig. 4 to Ernst Sachs, receive friction clutch rollers 11, each roller being retained and spaced apart in a separate alveolus or perforation of a guide ring 12, the disk shape body of which is secured on the sleeve 10 through a spring ring 25 seated in a circumferential groove of said coupling sleeve. The guide ring together with the rollers 11 is thus given a limited circumferential play relatively to the coupling sleeve. A toothed rim 21 provided on the back of the guide ring is faced by a rim 20 of corresponding ratchet teeth provided upon a non-rotatable member, e. g. the shiftable cone 17 of the back-pedalling coaster-brake.

In the example represented in the drawing, the brake is composed of an expansible longitudinally split brake-sleeve 15 enclosed in a mantle 15a of friction metal, a brake-expanding cone formed on a ball bearing member 16 stationarily fixed upon the wheel axle 26, and a shiftable expanding cone 17, both cones extending into the sleeve 15 with their smaller ends. A diametrical slot 18 of the fixed cone 16 receives dogs 15b of the brake-sleeve and axial projections 17a of the cone 17, thus non-rotatably interconnecting said three brake elements. Upon the larger end of the shiftable cone 17 the above-mentioned toothed rim 20 is provided.

A ring 19 is slipped on the axle 26 between the driving body and the movable cone 17 in order to maintain the required distance of said parts when during drive of the wheel the clutch 20, 21 is disengaged.

The entire gear described here-above is housed in the hub shell 5 of the bicycle-driving wheel, which shell is rotatably supported on the cone 16 and the driving body 7 by means of ball bearings. To the inner face of the shell the mantle 15a is expanded and adapted when the brake is to be applied.

The free-wheel hub as described, operates as follows:

In the inoperative or free-wheeling position of the driving gear as shown in Fig. 1, the coupling sleeve 10 is screwed to the left by the initial tension of the spring 13 while the toothed coupling 20, 21 is engaged and the coupling 23, 24 disengaged and the rollers 11 drawn into the cage ring 12.

Beginning drive of the sprocket wheel 8 and driving body 7 will carry round the coupling sleeve 10 through the interconnecting screw threads 9 and the tension of the spring 13 while the rollers 11 are retained in the perforations of their guide ring which is coupled to the cone 17. The rollers 11 are therefore moved outwards upon places of the roller receiving recesses which are more distant from the hub axis until they are pressed against the inner face of the hub shell, as shown by Fig. 4, thus coupling the same to the body by means of the coupling sleeve with the effect that the guide ring 12 will also be rotated and the coupling 20, 21 disengaged. Further, the propelling force transmitted to the coupling sleeve 10 will now overcome the power of the spring 13 and screw the coupling sleeve towards the driving body 7 until the coupling 23, 24 is closed, the rollers 11 thereby axially sliding on the hub shell. This angular movement will at the same time increase the tension of the spring 13. The drive is now substantially transmitted from the driving body to the hub shell 5 through the coupling 23, 24, the coupling sleeve 10 and the rollers 11.

Stopping of the drive by immobilizing the pedals will permit of idly rotating of the hub shell 5 and disengagement of the driving coupling 23, 24 as the spring 13 is released and screws the sleeve 10 in the forward direction on the driving body towards the coupling 20, 21 which therefore is closed. The rollers are finally entirely withdrawn from the hub-shell by a small instinctive backward rotation of the pedals and held fast in the perforations of the guide ring.

Back pedalling again interconnects the coupling 20, 21, the full back pressure then being transmitted through the threads 9, the sleeve 10, the rollers 11, the cage 12 and the coupling 20, 21 to the movable expanding cone 17. Axial displacement thereof effects the application of the brake.

I claim:

1. In a free-wheel hub with coaster-brake, the combination with a hub shell, of a driving body mounted therein, a coupling sleeve interengaged with the driving body by screw threads, coupling rollers held in circumferential oblique recesses of the coupling sleeve, a guide ring spacing and retaining the rollers in the recesses, said rollers being adapted to couple the driving means to the hub shell, a tooth coupling between the guide ring and an axially displaceable part of the internal hub brake, said coupling being capable of transmitting axial pressure from the driving gear to the brake, and a spring interposed between the driving body and the coupling sleeve, said spring being disposed to solicit the coupling sleeve on the driver in the forward direction.

2. In a free-wheel gear for cycle hubs of the kind described, the combination with a hub shell, of a driving body extending into the hub shell, screw threads provided on the driving body, a coupling sleeve interengaged with the driving body through corresponding female screw threads, a helical spring interconnecting the coupling sleeve with the driving body and tending to rotate the coupling sleeve in the direction of forward rotation relatively to the driving body, a tooth coupling adapted to interconnect the coupling sleeve with the driving body, eccentrical depressions in the periphery of the coupling sleeve, friction clutch rollers disposed therein, a guide ring spacing and retaining the rollers in said depressions, and a tooth coupling capable of interconnecting the guide ring with a non-rotatable element of the hub gear.

3. In a free-wheel gear for cycle hubs of the kind described, the combination with a hub shell, of a driving body extending into the shell, a coupling sleeve, interengaging right-handed screw threads of the driving body and coupling sleeve, a helical spring attached with its ends to the driving body and coupling sleeve respectively and tending to rotate the coupling sleeve on the driving body in the forward direction, an end flange provided on the coupling sleeve, facing coupling teeth of the driving body and end flange respectively capable of interconnecting same in the forward rotation, eccentric depressions in the periphery of the coupling sleeve the points thereof next to the hub-axis being located near the forward end, friction clutch rollers movable in said depressions and adapted to be pressed to the hub shell, a guide ring spacing and retaining the rollers in said depressions, and toothed coupling rims of the guide ring and a non-rotatable element of the hub gear respectively interengaged in free-wheeling and braking.

4. In a free-wheel gear for cycle hubs of the kind described, the combination with a hub shell, of a driving body extending into the shell, a coupling sleeve, interengaging right-handed screw threads of the driving body and coupling sleeve, a helical spring attached with its ends to the driving body and coupling sleeve respectively and tending to rotate the coupling sleeve on the driving body in the forward direction, an end flange provided on the coupling sleeve, facing coupling teeth of the driving body and end flange respectively capable of interconnecting same in the forward rotation, eccentric depressions in the periphery of the coupling sleeve growing shallower in the forward direction, friction clutch rollers movable in said depressions and adapted to be pressed to the hub shell, a guide ring spacing and retaining the rollers in said depressions, a brake mounted in the hub and adapted to be operated by the free-wheel gear, and toothed coupling rims of the guide ring and a facing part of the brake respectively interengaged in free-wheeling and braking.

WOLFGANG JORDAN.